United States Patent [19]

Fismer

[11] 4,105,560
[45] Aug. 8, 1978

[54] FILTER PLATE SHIFTER
[75] Inventor: William L. Fismer, Verona, N.J.
[73] Assignee: Envirotech Corporation, Menlo Park, Calif.
[21] Appl. No.: 768,018
[22] Filed: Feb. 14, 1977
[51] Int. Cl.² ............................................. B01D 25/14
[52] U.S. Cl. .................................... 210/230; 210/236
[58] Field of Search ................ 210/225, 230, 231, 236

[56] References Cited
U.S. PATENT DOCUMENTS
3,270,887  9/1966  Juhasz et al. .................... 210/231 X Primary Examiner—Frank A. Spear, Jr.
Attorney, Agent, or Firm—Robert E. Krebs; Hal J. Bohner

[57] ABSTRACT

A filter press for mechanically separating solids from liquid, slurries, suspensions and the like having a rigid frame including a first stationary end member which is a filter press head, a second stationary end member, and a pair of side rail members which extend horizontally and parallel to each other and which are supported at their opposite ends by the stationary end members. The filter press also includes a first and a second set of filter plates mounted for sliding movement on said side rail members and means interconnecting the plates in each set to allow limited travel of the interconnected plates away from one another while also allowing adjacent plates to move into abutting relationship with one another. A slide head member and ram means are mounted on the press to force the filter plates into abutting relationship, and a piston and cylinder assembly is pivotably fixed at one end to one of said side rail members and at its other end to the first plate of the first set of filter plates to separate the plates from one another.

12 Claims, 4 Drawing Figures

FILTER PLATE SHIFTER

BACKGROUND OF THE INVENTION

1. Field of the Invention

This invention relates to filter presses for separating solids from liquid and, more particularly, this invention relates to a mechanism and method for shifting groups of plates on filter presses.

2. State of the Art

Filter presses are well known for separating solids from liquids, slurries, suspensions and like aqueous feed streams. For example, filter presses are often utilized to dewater sewage sludge and various mineral slurries.

A filter press generally includes a series, or stack, of parallel plates covered on both sides with filter cloths and shaped to permit drainage. For filtration, the plates are forced into abutting relationship with one another by a slide head pushed by an hydraulic ram; then an aqueous feed stream is fed under pressure into the enclosed spaces between the successive abutting plates. The pressure of the feed stream forces liquid through the filter cloths, leaving behind cakes of solids on the cloths. After a period of time, the feed is stopped and the press is opened to separate the plates in the stack one from another. Following that, the cakes of the accumulated dewatered solids are discharged from the filter cloths.

In view of the preceding description, it may be appreciated that the term "press" is somewhat of a misnomer because filtration is not accomplished by mechanical squeezing. Instead, the pressure which accomplishes filtration is provided by a slurry or sludge pump operating on the feed stream. Typical pumps provide pressures up to several hundred psi.

To open a filter press, the aforementioned slide head is retracted and then the plates in the stack are shifted relative to one another in order to expose both sides of each plate for the discharge and removal of filter cake. Heretofore, various plate shifting devices have been devised or suggested. For example, my U.S. Pat. No. 3,306,455 teaches a carriage which is reciprocatable along the frame of a filter press to selectively move the filter plates one by one from one end of the filter press to the opposite end. As another example, my U.S. Pat. No. 3,232,435 teaches an automatic mechanism to separate and shift filter plates, again one by one. As still another example, U.S. Pat. No. 3,270,887 teaches a plate-and-frame type of filter press wherein a rotatable shaft is employed to separate groups of plates and frames after a slide head is retracted.

OBJECTS OF THE INVENTION

A primary object of the present invention is to provide improved ways and means for shifting the plates of a filter press.

A primary advantage of the present invention is that the reciprocative movement of a slide head is cooperatively utilized to open a filter press by shifting a group of filter plates.

BRIEF DESCRIPTION OF THE DRAWINGS

The preceding and further objects and advantages of the present invention can be readily understood by referring to the following description and appended drawings, which are offered by way of illustration only and not in limitation of the invention, the scope of which is defined by the appended claims and equivalents to the materials, methods and means set forth therein. In the drawings:

DETAILED DESCRIPTION OF THE PREFERRED EMBODIMENT

Figure 1:
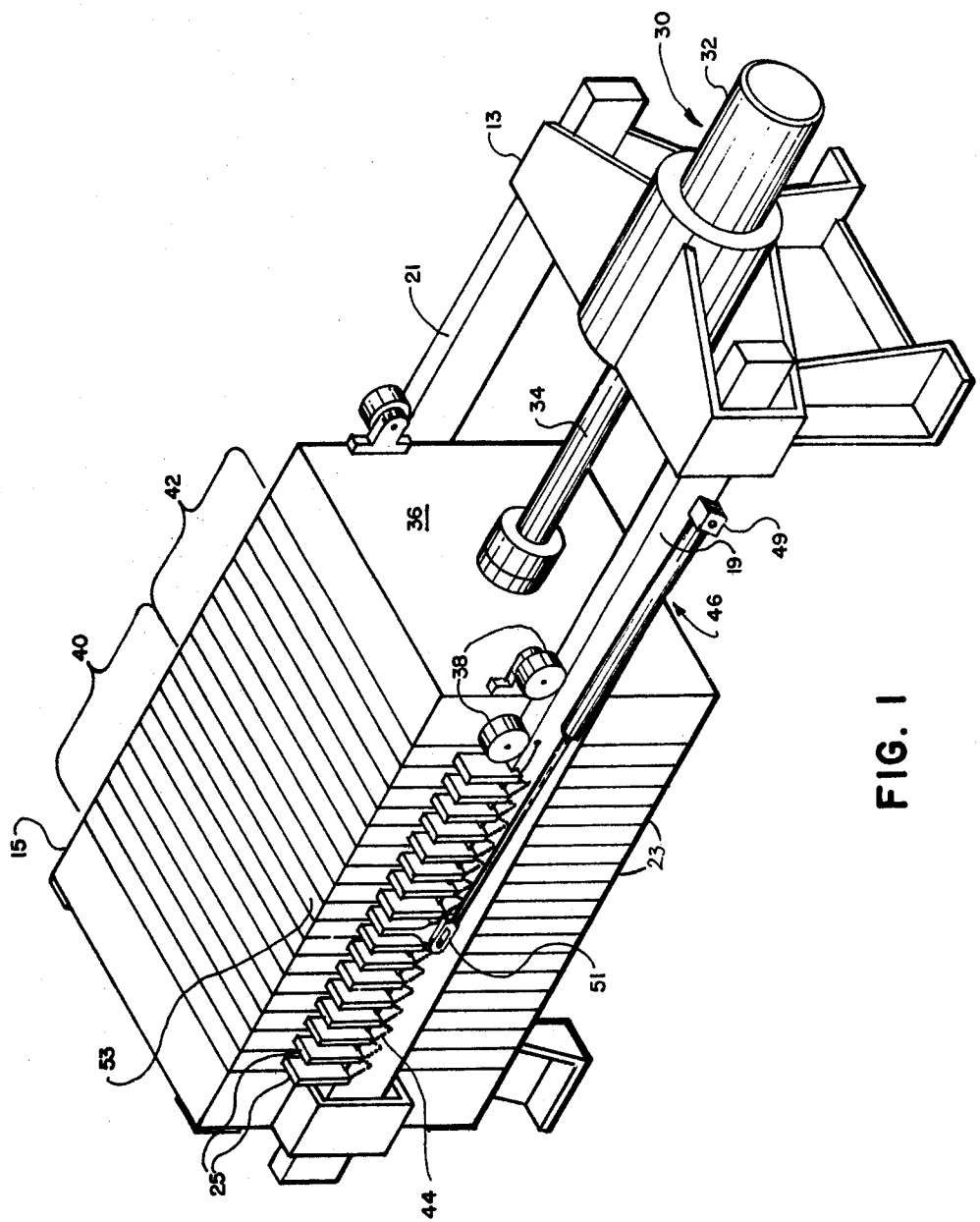
FIG. 1 is a pictorial view which schematically illustrates a filter press according to the present invention.

The filter press in FIG. 1 generally includes a frame having stationary opposite end members 13 and 15, respectively, which support two elongated side rail members 19 and 21 that extend horizontally and parallel to each other on opposite sides of the end members. The end member 15 is typically called the press head. A plurality of vertically disposed filter plates 23, collectively called a stack, are mounted between the side rail members 19 and 21 for movement toward and away from one another. Such filter plates are conventional and well known; for that reason, there is no discussion or illustration herein of the means to convey an aqueous feed stream to the plates or of the means to convey filtrate from the plates. In the illustrated embodiment, the filter plates 23 are each provided with flanges or handles 25 on their opposite sides to slidably support the filter plates on the side rail members; this too is conventional.

To the end member 13 of the filter press is fixedly mounted an hydraulic ram 30 or its equivalent, such as a screw-type jack, which functions to selectively force the filter plates together in abutting relationship. With respect to the illustrated embodiment, it should be understood that the hydraulic ram 30 comprises a double acting cylinder 32 which houses a piston that travels reciprocatively within the cylinder. Fixed to the piston for movement therewith is a horizontally-extending rod or plunger 34. A follower plate 36, called a slide head herein, is connected to the piston rod 34 and is slidably supported by the side rail members 19 and 21 to press against the filter plates 23 to close the press. In the illustrated embodiment, the slide head 36 is guided by means of supporting rollers 38 which ride upon the upper edges of the side rail members 19 and 21. The illustrated hydraulic ram and slide head arrangement and various modifications thereof are also well known in this art.

According to the present invention, the stack of filter plates 23 comprise at least two separate and distinct sets of adjacent filter plates and, furthermore, all of the plates within a particular set are interconnected and the set adjacent the slide head 36 is connected thereto. In the embodiment illustrated in FIGS. 1-3, two sets of filter plates are designated 40 and 42, respectively. In all the drawings, the interconnection between the plates in a set is shown as being provided by flexible chains 44. Each chain has several links and is secured at its opposite ends to the handles 25 of the adjacent filter plates in a set. Other interconnection means could be provided; for example, the filter plates 23 can be interconnected by rigid links of the type shown in aforementioned U.S. Pat. No. 3,270,887. The important characteristic of the interconnection means is that it allows only limited travel of the interconnected plates away from one another, yet also allows adjacent plates to move into abutting relationship with one another. It should be noted that the first plate at the right end of the set 42 is also connected by a flexible chain 44 to the slide head 36.

Figure 2:
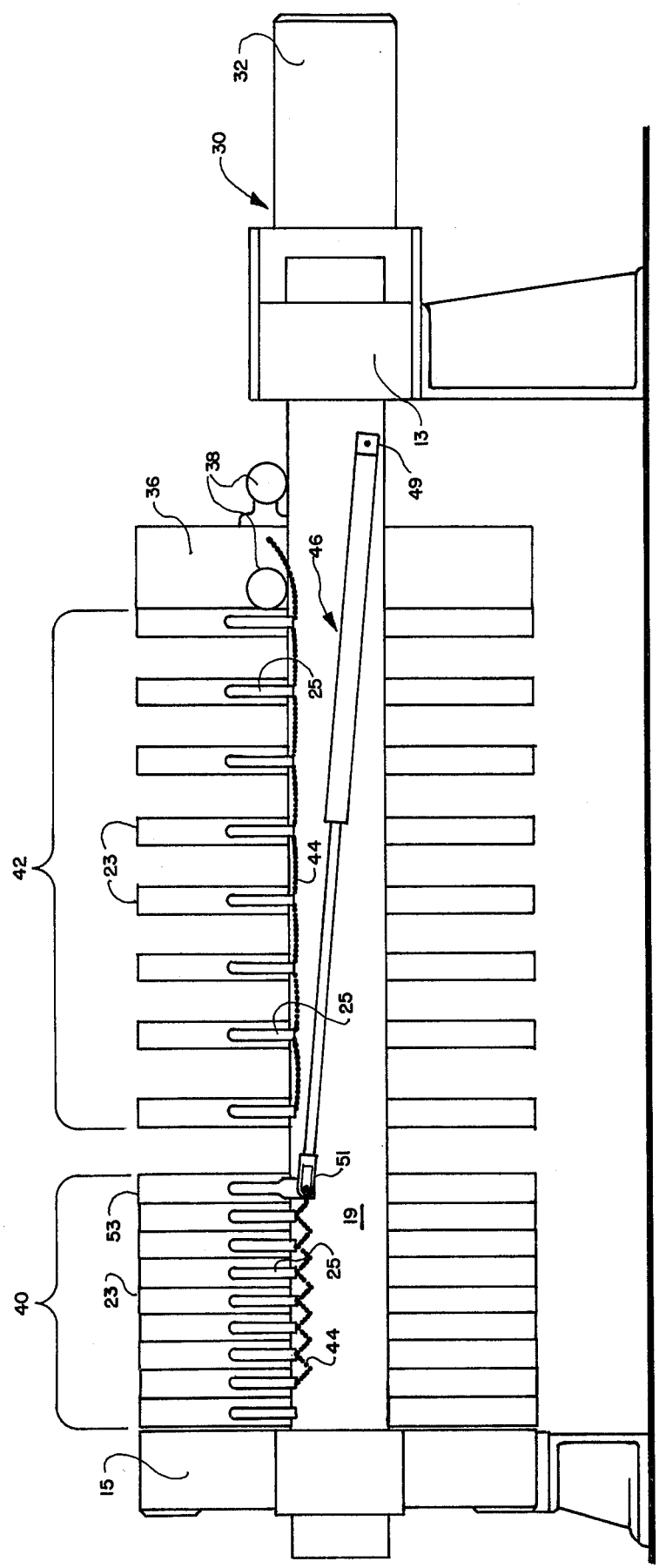
FIG. 2 is a side elevational view of the filter press of FIG. 1 showing one position of a plate shifting mechanism according to the present invention.
Figure 3:
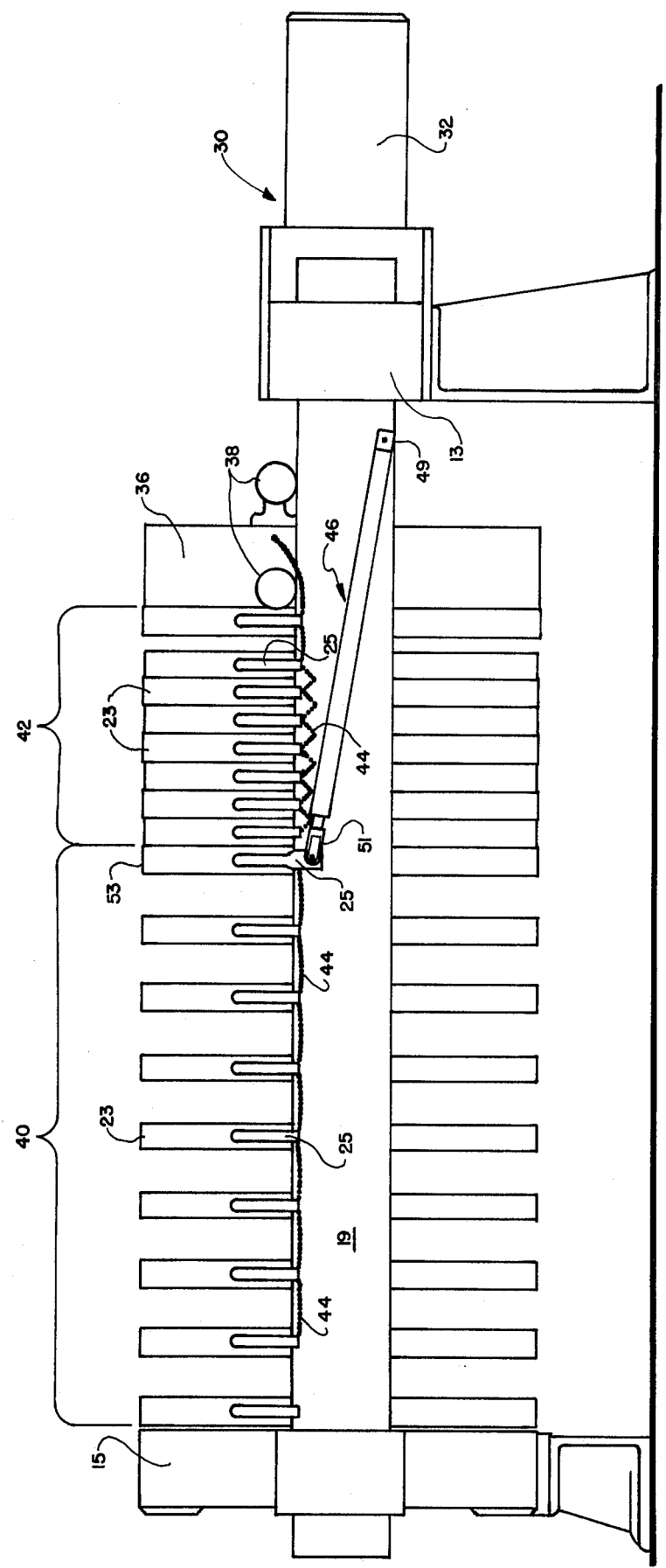
FIG. 3 is a side elevational view of the filter press of FIG. 1 showing a second position of the plate-shifting mechanism.

Further according to the present invention as illustrated in FIGS. 1–3, a piston and cylinder assembly 46 is affixed at one end to the side rail member 19 by pivot means 49 mounted near the end of the press at ram 30. The other end of the piston and cylinder assembly 46 is connected to a certain one of the plates of the first set 40 by a pivot means 51. The particular filter plate to which the piston and cylinder assembly 46 is affixed is the first plate of the first set 40 and is designated 53; it is the one in set 40 nearest to the second set 42. The piston and cylinder assembly 46 is conventional; the piston rod of the assembly can be moved to telescope in and out of the cylinder by selectively introducing hydraulic fluid into the cylinder and removing it therefrom by suitable hydraulic power means, not shown. Although the illustrations only show the piston and cylinder assembly 46 on one side of the filter press, it should be understood that there is a similar such assembly fixed to the opposite side of the press. In other words, the particular filter plate 53 has a piston and cylinder assembly attached to both of its side edges.

The operation of the machine shown in FIGS. 1–3 can now be understood. When the filter press is operating in the filtering mode, the machine is in the position shown in FIG. 1 and slurry is filtered by pumping through the plates of the press. After a certain amount of slurry has been filtered, cakes of filtered solids build up between the plates and reach such a thickness that it becomes necessary to separate the plates in order to remove the cakes. At that time, the flow of slurry to the press is stopped and the hydraulic ram 30 is actuated so that the piston rod 34 is retracted into the cylinder 32 thereby causing the slide head 36 to move away from the stacked plates. As the slide head 36 initially begins to travel toward the cylinder 32, it takes up the slack in the chain 44 by which the slide head is connected to the first plate in the second set 42. As soon as that chain goes taut, the first plate of the second set 42 is pulled away from the rest of the stack and begins to move with the slide head.

As the slide head 36 travels farther and farther toward the cylinder 32, slack is taken up in the chains 44 which connect the plates in the second set 42 and those plates are sequentially pulled away and separated from one another by distances determined by the taut length of the chains between the plates. Finally, by the time the slide head 36 reaches the end of its travel toward the cylinder 32, the plates in the second set 42 have all been sequentially and serially pulled along by the chains 44 until each plate in the set 42 is separated from adjacent plates; at that time, the plates will be in the position shown in FIG. 2. It should be understood that, when the plates in the second set 42 are separated from one another, the filter cakes which are formed between those plates fall away from the plates and out of the press; such discharge of the filter cakes can be accomplished manually or automatically in a manner such as described, for example, in U.S. Pat. No. 3,347,383.

When the slide head 36 is in the position shown in FIG. 2, the plates of the first set 40 are still in abutting relationship with one another and the piston and cylinder assembly 46 is in a fully extended position. As the next step, the piston and cylinder assembly 46 is actuated to retract the piston rod into the cylinder, which action pulls the first filter plate 53 at the right end of the first set 40 in the direction of the slide head 36. As the piston rod of the assembly 46 continues to retract, each of the plates of the first set 40 is sequentially tugged along until the plates reach the position shown in FIG. 3. When the piston of the assembly 46 has been fully retracted, the plates in the first set 40 are separated from one another and the filter cakes which were formed between those plates are discharged from the press. It can be seen in FIG. 3 that the spreading movement of the plates in the first set 40 will, in turn, push the plates in the second set 42 into abutting relationship with one another at the right end of the press. After the FIG. 3 position has been reached, the ram 30 is again actuated to extend the piston rod 34 to close the press to the FIG. 1 configuration, at which time the filtering cycle can again be initiated.

It should be understood that the pivot means 49 of the piston and cylinder assembly 46 can be connected at the end of the side rail 19 near the press head 15. In that case, the piston and cylinder assembly 46 would be extended, not retracted, to spread the plates in the set 40. This modification has the advantage that the piston rod is protected inside the cylinder during the time that the press is closed, that is, when the press is in the FIG. 1 configuration.

Figure 4:
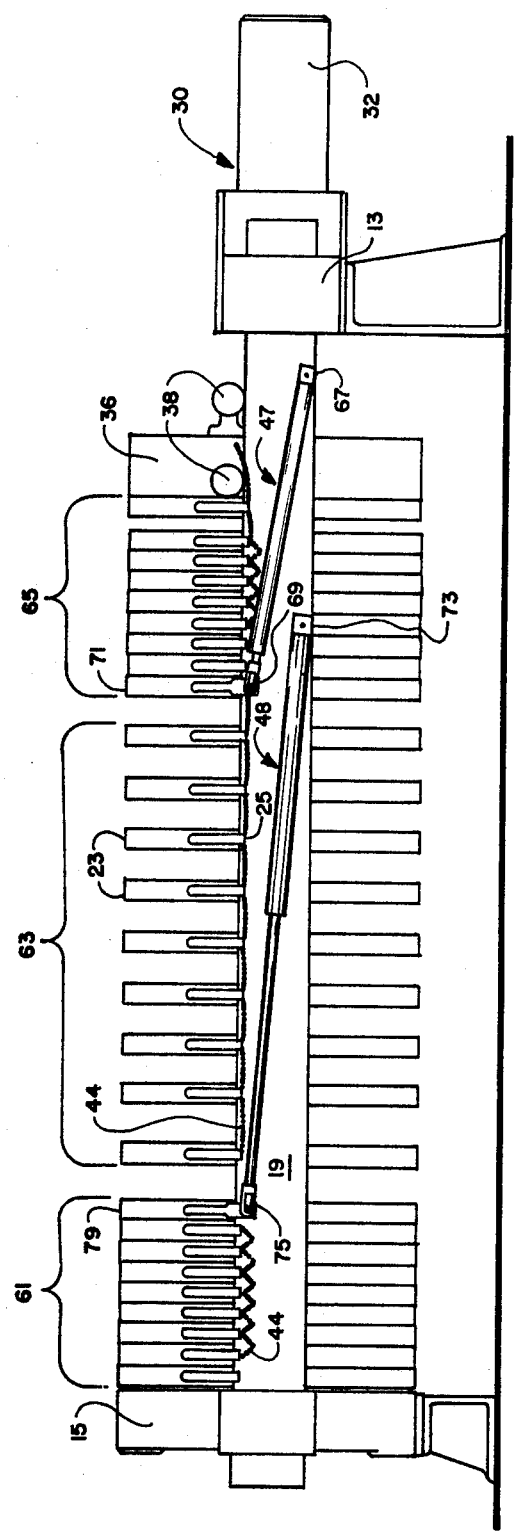
FIG. 4 is a side elevational view of a particular modification of a filter press according to the present invention.

A particular modification of the present invention is illustrated in FIG. 4. Because the filter press in that figure is generally the same as the one illustrated in FIGS. 1–3, similar parts are designated with the same reference numerals. The filter press of FIG. 4 differs from the earlier described one insofar as it includes three sets of filter plates, designated 61, 63 and 65, respectively.

The plates of set 61 are interconnected each to another by chains 44, as are the plates in sets 63 and 65. The plate of the third set 65 which is nearest the slide head 36 is also connected thereto by a chain 44, as was the case in the earlier illustrated press.

The first plate of the first set 61, which is nearest the slide head 36 and is designated plate 79, is connected to piston and cylinder assembly 48 by pivot means 75 so that the assembly 48 moves the set 61 away from slide head 36 when the piston is extended and moves the set 61 toward slide head 36 when the piston is retracted. The first plate of the second set 63, which is nearest slide head 36 and is designated plate 71, is connected to piston and cylinder assembly 47 by pivot means 69 so that the assembly moves the second set 63 away from the slide head 36 when the piston is extended and moves the second set 63 toward slide head 36 when the piston is retracted.

The operation of the particular modification illustrated in FIG. 4 can now be understood. Generally speaking, the operation of the particular modification is similar to the operation of the filter press shown in FIGS. 1–3 and described above. Therefore, the operation of the particular modification will be described generally.

When the particular modification of the filter press shown in FIG. 4 is operating in the filtering mode and slurry is being filtered, the plates 23 are all held in abutting relationship by slide head 36. After slurry has been filtered and it becomes necessary to separate the plates 23 to remove the cakes of filtered solids between them, the piston rod 34 is retracted, thereby moving the slide head 36 toward the ram 30 and separating the plates of the third set 65, which is the set of plates nearest the slide head 36. Thereafter, the piston and cylinder assembly 47 is retracted to separate the plates of the second set 63 and force the plates of the third set 65 into abutting relationship with one another and against the slide head 36. This phase of operation is illustrated in FIG. 4. Thereafter, the piston of piston and cylinder assembly 48 is retracted to separate the plates of the first set 61 and force the plates of the second set 63 into abutting relationship against each other and against the third set 65. Thus, it can be seen that during the operation described above each of the plates 23 is temporarily separated from the plates immediately adjacent thereto to permit cakes which are formed between those plates to fall away from the plates and out of the press. After this phase of the operation is completed the piston rod 34 is extended to force all the plates into abutting relationship with each other and against the press head 15 and filtering can be initiated again.

I claim:

1. A filter press for mechanically separating solids from liquid, slurries, suspensions and the like, comprising:
   a. a rigid frame including a first stationary end member which is a filter press head, a second stationary end member, and a pair of elongated side rail members which extend horizontally and parallel to each other and which are supported at their opposite ends by said stationary end members;
   b. a first set of filter plate members mounted for sliding movement on said side rail members;
   c. a second set of filter plate members mounted for sliding movement on said side rail members and disposed between said first set of filter plate members and said second stationary end member;
   d. means interconnecting the plates in each of said sets to allow limited travel of the interconnected plates away from one another while also allowing adjacent plates to move into abutting relationship with one another;
   e. a slide head member slidably mounted on said side rail members between said second stationary end member and the first plate of said second set of filter plate members;
   f. means connecting said slide head to said first plate of said second set of filter plate members;
   g. ram means fixed to said second stationary end member and connected to said slide head member to reciprocatively move said slide head member to force the filter plates of said sets into abutting relationship; and
   h. a piston and cylinder assembly pivotably fixed at one of its ends to one of said side rail members and at its other end to the first plate of said first set of filter plates to separate said plate members of said first set from one another.

2. A filter press according to claim 1 wherein said piston and cylinder assembly is constructed and disposed to telescope to separate said plates of said first set from one another.

3. A filter press according to claim 1 wherein said piston and cylinder assembly is constructed and disposed to extend to separate said plates of said first set from one another.

4. A filter press according to claim 1 wherein said means interconnecting said plates of each of said sets comprise chains.

5. A filter press according to claim 1 wherein said first and second sets of filter plate members are not connected to one another.

6. A filter press according to claim 1 wherein said piston and cylinder assembly is double acting.

7. A filter press for mechanically separating solids from liquid, slurries, suspensions and the like, comprising:
   a. a rigid frame including a first stationary end member which is a filter press head, a second stationary end member, and a pair of elongated side rail members which extend horizontally and parallel to each other and which are supported at their opposite ends by said stationary end members;
   b. a first set of filter plate members mounted for sliding movement on said side rail members;
   c. one or more additional sets of filter plate members mounted for sliding movement on said side rail members and disposed between said first set of filter plate members and said second stationary end member;
   d. a last set of filter plate members mounted for sliding movement on said side rail members and disposed between said second stationary end member and the set of said one or more additional sets which is farthest from said first set;
   e. means interconnecting the plates in each of said sets to allow limited travel of the interconnected plates away from one another while also allowing adjacent plates to move into abutting relationship with one another;
   f. a slide head member slidably mounted on said side rail members between said second stationary end member and the first plate of said last set of filter plate members;
   g. means connecting said slide head to said first plate of said last set of filter plate members;
   h. ram means fixed to said second stationary end member and connected to said slide head member to reciprocatively move said slide head member in one direction of travel to separate the filter plates of said last set of filter plate members by action of said connecting means between said slide head member and the first filter plate of said last set of filter plate members and in the opposite direction of travel to force the filter plates of said sets into abutting relationship;
   i. a first piston and cylinder assembly pivotably fixed at one of its ends to one of said side rail members and at its other end to the first plate of said first set of filter plates; and
   j. one or more additional piston and cylinder assemblies each fixed at one of its ends to one of said side rail members and at its other end to the first plate of one of said one or more additional sets of filter plate members.

8. A filter press according to claim 7 wherein said piston and cylinder assemblies are constructed and disposed to telescope to separate said plates of said sets of filter plate members from one another.

9. A filter press according to claim 7 wherein said piston and cylinder assemblies are constructed and disposed to extend to separate said plates of said sets of filter plate members from one another.

10. A filter press according to claim 7 wherein said means interconnecting said plates of each of said sets comprises chains.

11. A filter press according to claim 7 wherein each of said sets of filter plate members are not connected to one another.

12. A filter press for mechanically separating solids from liquid, slurries, suspensions and the like, comprising:

a. a rigid frame including a first stationary end member which is a filter press head, a second stationary end member, and a pair of elongated side rail members which extend horizontally and parallel to each other and which are supported at their opposite ends by said stationary end members;

b. a first set of filter plate members mounted for sliding movement on said side rail members;

c. a second set of filter plate members mounted for sliding movement on said side rail members and disposed between said first set of filter plate members and said second stationary end member;

d. means interconnecting the plates in each of said sets to allow limited travel of the interconnected plates away from one another while also allowing adjacent plates to move into abutting relationship with one another;

e. a slide head member slidably mounted on said side rail members between said second stationary end member and the first plate of said second set of filter plate members;

f. means connecting said slide head to said first plate of said second set of filter plate members;

g. ram means fixed to said second stationary end member and connected to said slide head member to reciprocatively move said slide head member in one direction of travel to separate the filter plates of said second set of filter plate members by action of said connecting means between said slide head member and the first plate of said second set of filter plate members and in the opposite direction of travel to force the filter plates of said sets into abutting relationship; and h. a piston and cylinder assembly pivotably fixed at one of its ends to one of said side rail members and at its other end to the first plate of said first set of filter plates to separate said plate members of said first set from one another.

* * * * *